(12) United States Patent
Fekety et al.

(10) Patent No.: US 6,917,741 B2
(45) Date of Patent: Jul. 12, 2005

(54) METHODS FOR MANUFACTURING MICROSTRUCTURED OPTICAL FIBERS WITH ARBITRARY CORE SIZE

(75) Inventors: Curtis R. Fekety, Tioga, PA (US); Michael T. Gallagher, Corning, NY (US); Daniel W. Hawtof, Corning, NY (US); Karl W. Koch, III, Elmira, NY (US); Natesan Venkataraman, Corning, NY (US)

(73) Assignee: Corning Incorporated, Corning, NY (US)

( * ) Notice: Subject to any disclaimer, the term of this patent is extended or adjusted under 35 U.S.C. 154(b) by 220 days.

(21) Appl. No.: 10/298,374

(22) Filed: Nov. 18, 2002

(65) Prior Publication Data

US 2004/0096173 A1 May 20, 2004

(51) Int. Cl.[7] .............................. G02B 6/02; G02B 6/20; G02B 6/16
(52) U.S. Cl. ........................ 385/125; 385/123; 216/56; 216/97; 65/393; 65/401; 65/409; 65/411; 65/429
(58) Field of Search .......................... 65/393, 401, 409, 65/411, 429; 385/123, 125, 126; 216/24, 56, 97

(56) References Cited

U.S. PATENT DOCUMENTS

| | | | |
|---|---|---|---|
| 5,802,236 A | 9/1998 | DiGiovanni et al. | 385/27 |
| 6,301,421 B1 | 10/2001 | Wickham et al. | 385/126 |
| 6,444,133 B1 | 9/2002 | Fajardo et al. | 216/24 |
| 6,598,428 B1 * | 7/2003 | Cryan et al. | 65/409 |
| 6,631,234 B1 * | 10/2003 | Russell et al. | 385/125 |
| 2003/0012535 A1 | 1/2003 | Town | 385/125 |
| 2003/0056550 A1 * | 3/2003 | Tanaka et al. | 65/428 |
| 2003/0230118 A1 | 12/2003 | Dawes et al. | 65/379 |
| 2003/0231846 A1 | 12/2003 | Fajardo et al. | 385/125 |
| 2004/0050110 A1 | 3/2004 | Berkey et al. | 65/393 |

OTHER PUBLICATIONS

Knight et al., "New Ways to Guide Light", Apr. 12, 2002, Scinece, vol. 296, pp. 276–277.
Knight et al., "Progress in Photonic Crystal Fiber Waveguides", Invited Talk, PECS Workshop, Mar. 2000.
Patent Abstracts of Japan vol. 2002, No. 09, Sep. 4, 2002; JP 2002 137931 A, May 14, 2002.
Patent Abstracts of Japan vol. 2003, No. 01, Jan. 14, 2003; JP 2002 277669A, Sep. 25, 2002.

* cited by examiner

*Primary Examiner*—Akm Enayet Ullah
*Assistant Examiner*—Daniel Petkovsek
(74) *Attorney, Agent, or Firm*—James V. Suggs; Kevin M. Able

(57) ABSTRACT

The present invention provides methods for manufacturing microstructured optical fibers having an arbitrary core size and shape. According to one embodiment of the invention, a method of fabricating a photonic band gap fiber includes the steps of forming an assembly of stacked elongate elements, the assembly including a first set of elongate elements, the first set of elongate elements defining and surrounding a core volume, and a second set of elongate elements surrounding the first set of elongate elements, wherein the core volume defined by the first set of elongate elements has a shape that is not essentially an integer multiple of the external shape of the elongate elements of the second set of elongate elements; including the assembly in a photonic band gap fiber preform; and drawing the photonic band gap fiber preform into the photonic band gap fiber.

16 Claims, 11 Drawing Sheets

METHODS FOR MANUFACTURING MICROSTRUCTURED OPTICAL FIBERS WITH ARBITRARY CORE SIZE

BACKGROUND OF THE INVENTION

1. Field of the Invention

The present invention relates generally to optical fibers, and more specifically to methods for the fabrication of optical fibers and optical fiber preforms.

2. Technical Background

Optical fibers formed completely from glass materials have been in commercial use for more than two decades. Although such optical fibers have represented a leap forward in the field of telecommunications, work on alternative optical fiber designs continues. One promising type of alternative optical fiber is a microstructured optical fiber, which includes holes or voids running longitudinally along the fiber axis. The holes generally contain air or an inert gas, but may also contain other materials.

Microstructured optical fibers may be designed to have a wide variety of properties, and may be used in a wide variety of applications. For example, microstructured optical fibers having a solid glass core and a plurality of holes disposed in the cladding region around the core have been constructed. The arrangement, spacings and sizes of the holes may be designed to yield microstructured optical fibers with dispersions ranging anywhere from large negative values to large positive values. Such fibers may be useful, for example, in dispersion compensation. Solid-core microstructured optical fibers may also be designed to be single mode over a wide range of wavelengths. Solid-core microstructured optical fibers generally guide light by a total internal reflection mechanism; the low index of the holes can be thought of as lowering the effective index of the cladding region in which they are disposed.

One especially interesting type of microstructured optical fiber is the photonic band gap fiber. Photonic band gap fibers guide light by a mechanism that is fundamentally different from the total internal reflection mechanism. Photonic band gap fibers have a photonic crystal structure formed in the cladding of the fiber. The photonic crystal structure is a periodic array of holes having a spacing on the order of the wavelength of light. The core of the fiber is formed by a defect in the photonic crystal structure cladding. For example, the defect may be a hole of a substantially different size and/or shape than the holes of the photonic crystal structure. The photonic crystal structure has a range of frequencies, known as the band gap, for which light is forbidden to propagate in the photonic crystal structure. Light introduced into the core of the fiber having a frequency within the band gap will not propagate in the photonic crystal cladding, and will therefore be confined to the core. A photonic band gap fiber may have a core that is formed from a hole larger than those of the surrounding photonic crystal structure; in such a hollow-core fiber, the light may be guided in a gaseous medium, lowering losses due to absorption and Rayleigh scattering of glass materials. As the light is guided in a gaseous medium, hollow-core fiber may also have extremely low non-linearity.

Microstructured optical fibers are fabricated using methods roughly analogous to the manufacture of all-glass optical fiber. A structured preform having the desired arrangement of holes is formed, then drawn into fiber using heat and tension. In one conventional method of making a structured optical fiber preform, hexagonal-sided hollow glass tubes are stacked together to form an assembly having a lattice structure, and one or more of the tubes are removed to form a core volume in the center of the lattice structure. Since the core volume is formed by the removal of one or more tubes from the assembly, it has a shape and size restricted to integer multiples of the shape of the hexagonal-sided tubes of the assembly. The lattice structure is redrawn to reduce its cross-sectional size, then sleeved and drawn into optical fiber having a lattice-like array of holes surrounding a core defect void. The core defect void has a shape and size corresponding to the shape and size of the core volume. Since the optical properties (e.g. dispersion, attenuation) of the fiber may depend strongly on the cross-sectional size and shape of the core defect void, a method for making a microstructured optical fiber having a core defect void with an arbitrary shape and size would be advantageous.

SUMMARY OF THE INVENTION

One aspect of the present invention relates to a method of fabricating a photonic band gap fiber having a photonic band gap structure, the photonic band gap structure having a pitch and a core defect void formed therein, the method including the steps of: forming an assembly of stacked elongate elements, the assembly including a first set of elongate elements, the first set of elongate elements defining and surrounding a core volume, the core volume being contiguous to an outer edge of each elongate element of the first set of elongate elements, and a second set of elongate elements surrounding the first set of elongate elements, each elongate element of the second set of elongate elements having an external polygonal shape, each of the second set of elongate elements having a hole formed longitudinally therein, wherein the core volume defined by the first set of elongate elements has a shape that is not essentially an integer multiple of the external shape of the elongate elements of the second set of elongate elements; including the assembly in a photonic band gap fiber preform; and drawing the photonic band gap fiber preform into the photonic band gap fiber.

Another aspect of the present invention relates to a photonic band gap fiber comprising a photonic band gap structure formed from a material with an array of holes formed therein, adjacent holes of the array having a wall of material formed therebetween; and a core defect void formed in the photonic band gap structure, the core defect void and an adjacent hole of the array having a wall of material formed therebetween, wherein the thickness of the wall of material between the core defect void and an adjacent hole is within about 50% of the thickness of the wall of material between adjacent holes of the array.

Another aspect of the present invention relates to a method of cleaning an article used in the fabrication of microstructured optical fiber, the method comprising the steps of disposing the article in a furnace; substantially evacuating the furnace; and introducing a chlorine-containing gas into the furnace. The article may be a stacked assembly of elongate elements, a redrawn body, an etched body, or a structured optical fiber preform. The article may be allowed to cool in an inert atmosphere in the furnace.

The methods and optical fibers of the present invention result in a number of advantages over prior art methods and optical fibers. For example, the methods of the present invention enable the construction of microstructured optical fibers and preforms having a core volume with an arbitrary shape and size. The core volume is not limited by the size of the elongate elements used to form the microstructure of the fiber, and may be selected to provide the desired optical performance. The methods of the present invention also enable the fabrication of a photonic band gap fiber having a desirably thin wall defining the core defect void.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

Figure 1:
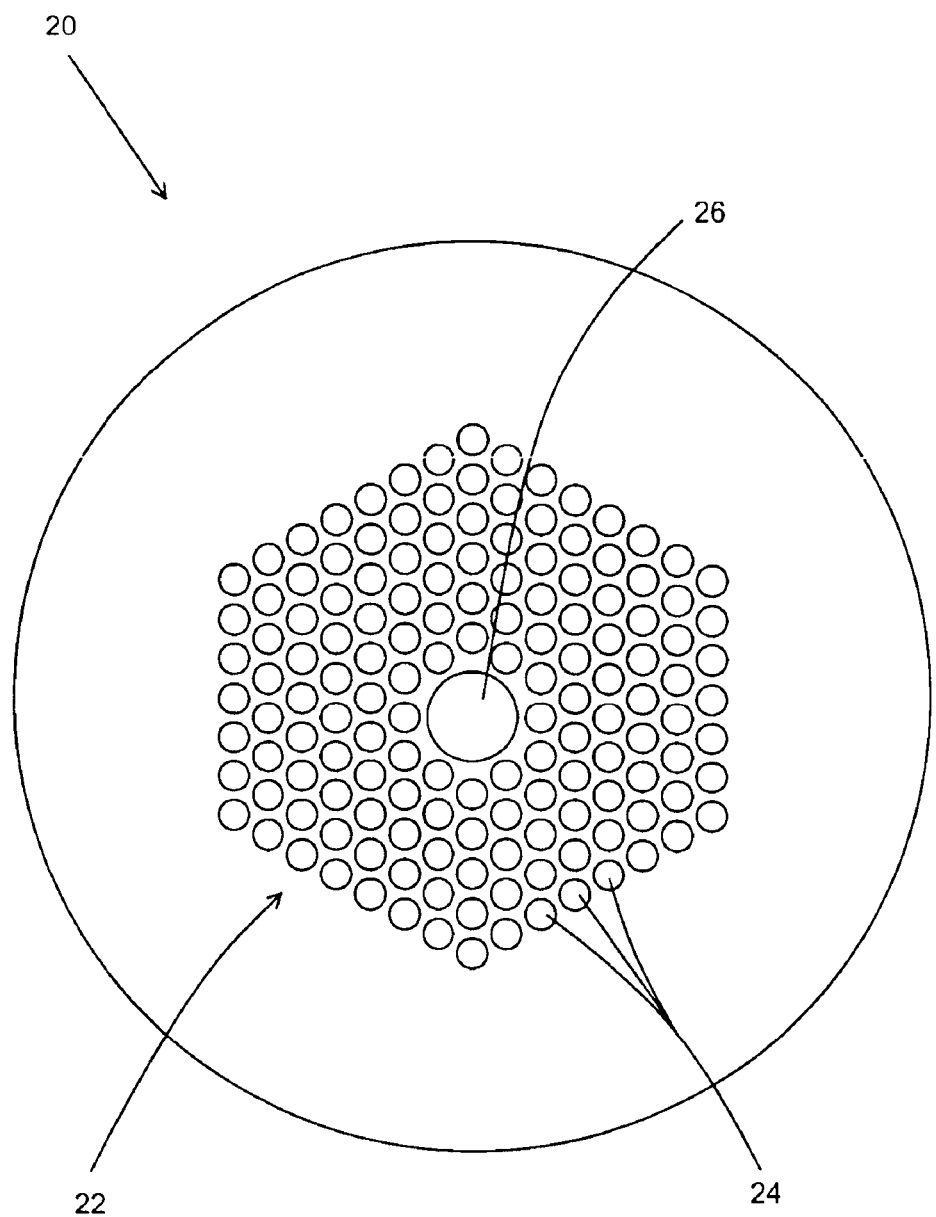
FIG. 1 is a cross-sectional view of a conventional photonic band gap fiber.

One aspect of the present invention relates to a method of fabricating a photonic band gap fiber. An example of a conventional photonic band gap fiber is shown in cross-sectional view in FIG. 1. The photonic band gap fiber 20 has a photonic band gap structure 22 formed from a periodic array of holes 24. The pitch of the photonic band gap structure is the distance between adjacent holes of the array. The photonic band gap structure has a core defect void 26 formed in it. Core defect void 26 acts as the light-guiding core of the photonic band gap fiber. In use, light propagating in the photonic band gap fiber is essentially forbidden from propagating in the photonic band gap structure, and is localized in the core defect void.

Figure 2:
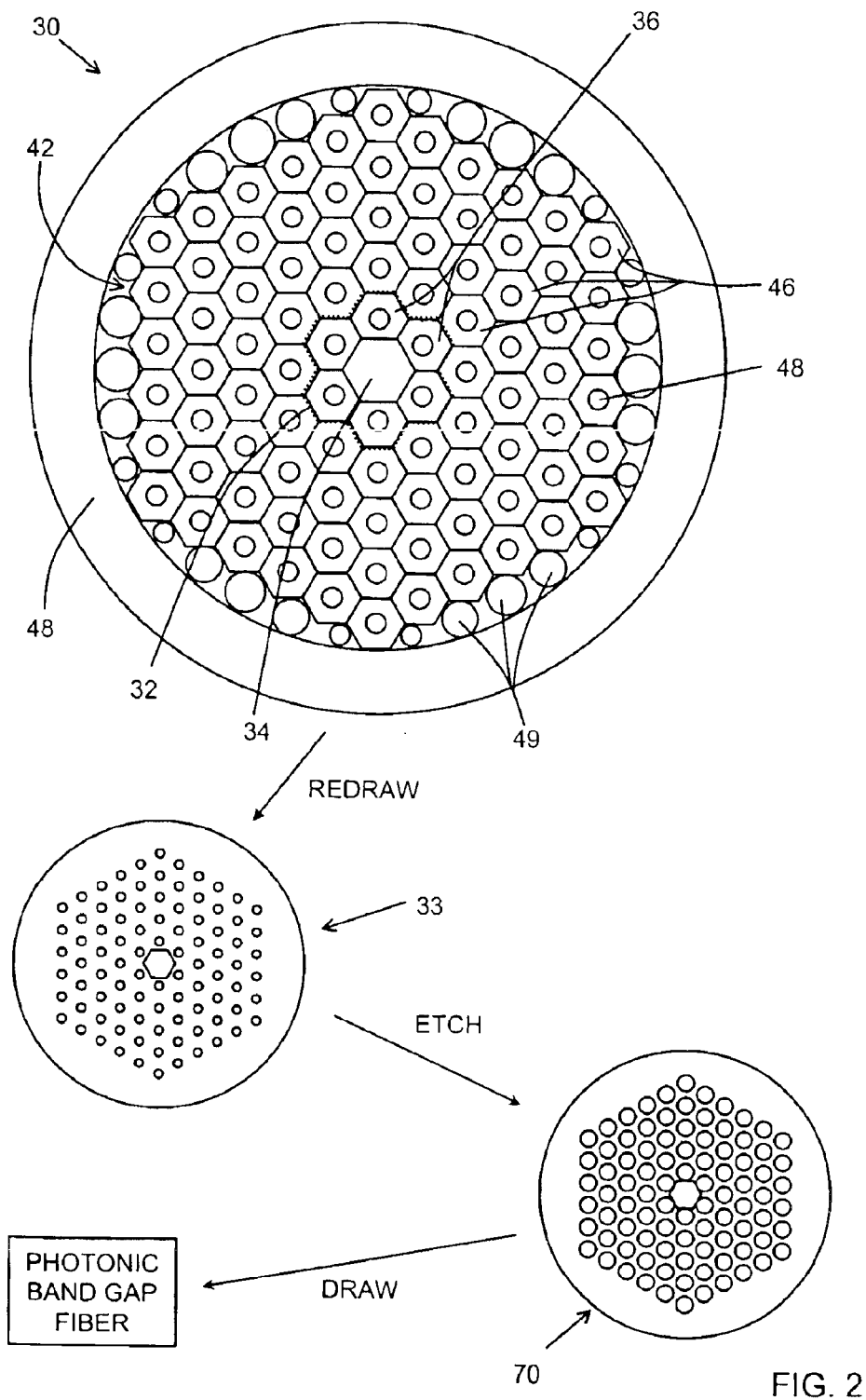
FIG. 2 is a cross-sectional view of a method of making a photonic band gap fiber according to one embodiment of the present invention.
Figure 3:
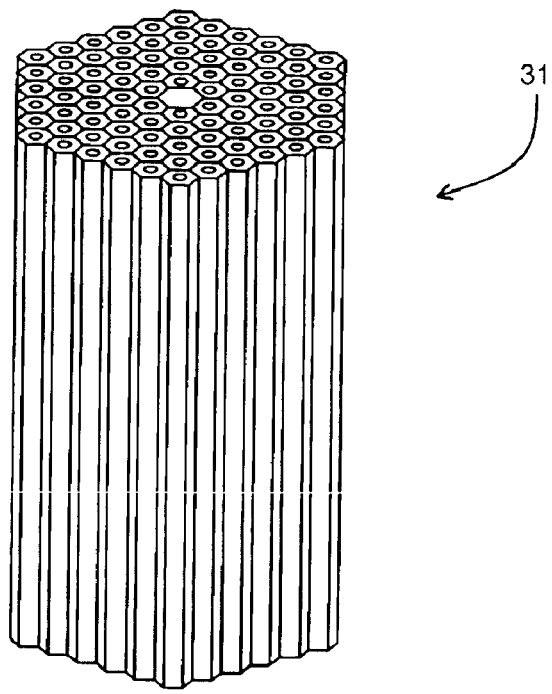
FIG. 3 is a perspective view of an assembly of elongate elements formed in accordance with one embodiment of the present invention.

One embodiment of the invention, shown in cross-sectional view in FIG. 2, provides a method for fabricating a photonic band gap fiber. First, a plurality of elongate elements are stacked into an assembly 30. In the example of FIG. 2, the elongate elements are formed from silica glass. The assembly includes plurality of elongate elements 36 which together form a first set 32 of elongate elements. First set 32 of elongate elements defines and surrounds a core volume 34. Core volume 34 is contiguous to an outer edge of each elongate element 36 of first set 32 of elongate elements. The assembly further includes a second set 42 of elongate elements 46 surrounding first set 32 of elongate elements 36. Each elongate element 46 of second set 42 of elongate elements has an external shape. The elongate elements 46 of second set 42 of elongate elements may have a common external shape. For example, in the assembly 30 of FIG. 2, the external shape of each elongate element 46 of second set 42 of elongate elements is a regular hexagon. Each elongate element 46 of second set 42 of elongate elements has a hole 48 formed longitudinally (i.e. perpendicular to the page in FIG. 2) therein. The holes 48 of second set 42 of elongate elements 46 are arranged in a periodic array. In order to provide mechanical stability and to provide a preform having a circular external cross-section, the assembly may be assembled and inserted into a glass tube 48 with space-filling rods 49. The stacked arrangement 31 of elongate elements (before insertion into the glass tube) is shown in perspective view in FIG. 3.

Figure 4:
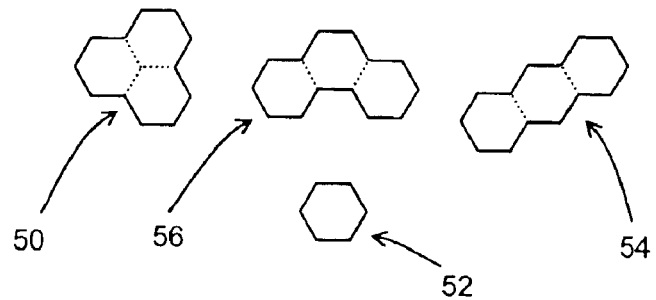
FIG. 4 is a diagram illustrating shapes that are integral multiples of a given regular hexagon.
Figure 5:
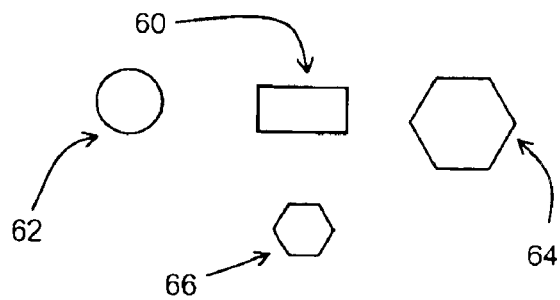
FIG. 5 is diagram illustrating shapes that are not integral multiples of a given regular hexagon.

As described above, core volume 34 is defined by first set 32 of elongate elements 36. Core volume 34 has a shape that is not an integer multiple of the external shape of the elongate elements 46 of the second set 42 of elongate elements. As used herein, a first shape is an integer multiple of a second shape if the first shape can be constructed by contiguously arranging an integral number of the second shape without overlapping. For example, shapes 50, 52 and 54 of FIG. 4 can be formed by arranging four of hexagonal shape 56 in a non-overlapping fashion. As such, shapes 50, 52 and 54 are integral multiples of hexagonal shape 56. Conversely, shapes 60, 62 and 64 of FIG. 5 cannot be formed by contiguously arranging integral numbers of the hexagonal shape 66 in a non-overlapping fashion. As such, shapes 60, 62 and 64 are not integral multiples of hexagonal shape 66. As shown in FIG. 5, two geometrically similar shapes having different sizes (e.g. two regular hexagons, one with 1 cm edges, the other with 1.2 cm edges) are considered herein to have substantially different shapes.

In order for the core volume of the assembly to have a shape that is not an integer multiple of the external shape of the elongate elements of the second set of elements, it may be desirable for at least one of the elongate elements of the first set of elements to have a substantially different external shape than the elongate elements of the second set of elongate elements. For example, in the assembly 30 of FIG. 2, the elongate elements 46 of second set 42 of elongate elements have regular hexagon external shapes. The external shapes of the elongate elements 36 of the first set 32 of elongate elements are not regular hexagons; they are each truncated along one side. As such, in the example of FIG. 2, the external shape of each elongate element of the first set of elongate elements is substantially different than the external shapes of the elongate elements of the second set of elongate elements.

The assembly 30 is included in an optical fiber preform. In the method shown in FIG. 2, the assembly is redrawn to reduce its size and to consolidate the assembly into a substantially monolithic body 33. It may be desirable to pull a vacuum on the spaces between stacked elongate elements 36 and 46 during the redraw step in order to close any interstitial voids between the external surfaces of the elongate elements. Body 33 is then etched with $NH_4F.HF$ to increase the sizes of the holes of the periodic array as well as of the core volume. Redraw and etching procedures are described, for example, in U.S. Pat. No. 6,444,133, the specification of which is hereby incorporated herein by reference in its entirety. Redrawn, etched body 70 is drawn into a photonic band gap fiber 72 using methods familiar to the skilled artisan. Before being drawn into fiber, redrawn etched body 70 may be sleeved with an overclad tube (not shown) to provide a fiber with a larger outer diameter.

Figure 6A:
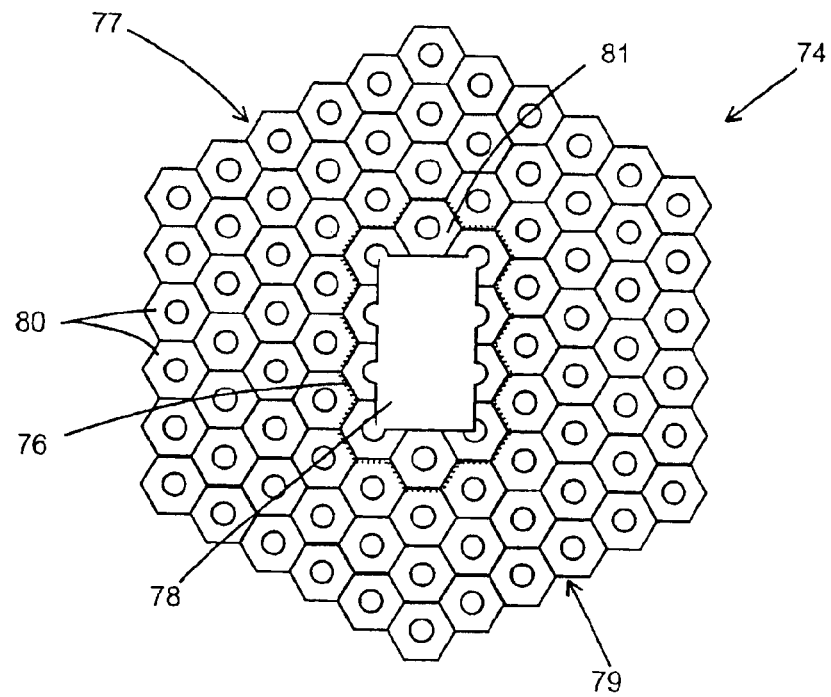
FIG. 6 is a cross-sectional view of two assemblies according to alternative embodiments of the present invention.
Figure 6B:
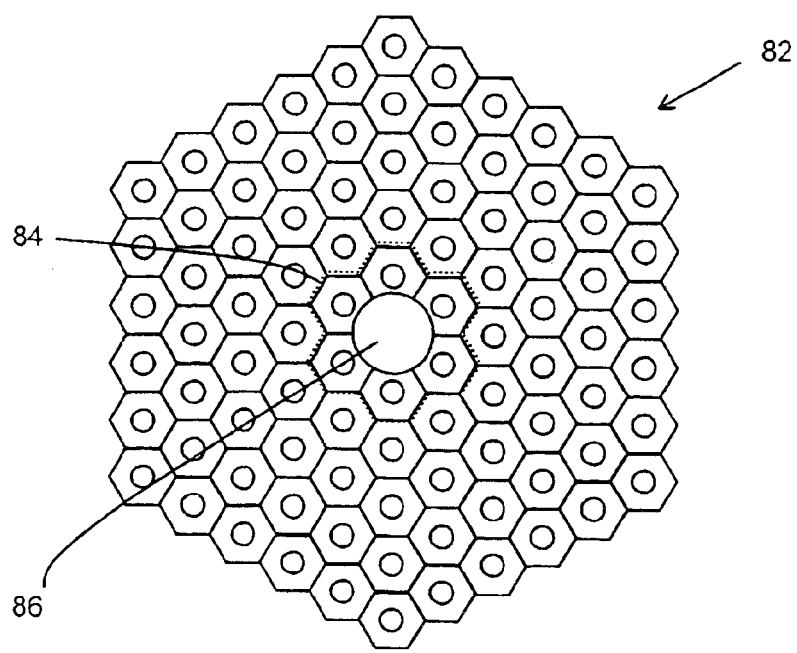

As shown in FIG. 2, holes 48 of the elongate elements 46 of second set of elongate elements 42 may form a periodic array. The hole-to-hole distance is the pitch of the periodic array. The periodic array is interrupted by core volume 34. In the embodiment of FIG. 2, the core volume has a rotational symmetry (around an axis parallel to the longitudinal direction of the assembly) that is essentially the same as the rotational symmetry of external shape of the elongate elements of the second set of elongate elements (i.e. both have a $C_6$ rotational axis). The core volume rotational symmetry is also essentially the same as that of the periodic array formed by the holes of the second set of elongate elements. In other embodiments of the invention, the core volume may have a substantially different rotational symmetry than the external shape of the elongate elements of the second set of elongate elements. The core volume may likewise have a substantially different rotational symmetry than that of the periodic array formed by the holes of the second set of elongate elements. For example, in FIG. 6, stacked assembly 74 is formed with a first set of elongate elements 76 defining a core volume 78. Core volume 78 has a $C_2$ rotation axis, while periodic array 77 and the external shapes of the elongate elements 79 of the second set 77 of elongate elements have $C_6$ rotation axes. In this example, two of the elongate elements 81 of the first set of elongate elements have external shapes substantially the same as the elongate elements 80 of the second set of elongate elements. It may be desirable to place a rectangular core tube (not shown) in the core volume in order to provide a rectangular core defect void in the eventual fiber. Stacked assembly 82 is formed with a first set of elongate elements 84 defining a circular void volume 86 ($C_\infty$ rotation axis). The skilled artisan may fabricate stacked assemblies having other core volume shapes and sizes (e.g. square, triangular, elliptical, or more complex) by selecting the arrangement and external shapes of the elongate elements of the first set of elongate elements. The photonic band gap fibers made from these assemblies may have core defect voids having substantially different shapes than the core volume of the assembly due to material deformation during the draw as well as insertion of other elements into the core volume.

Figure 7:
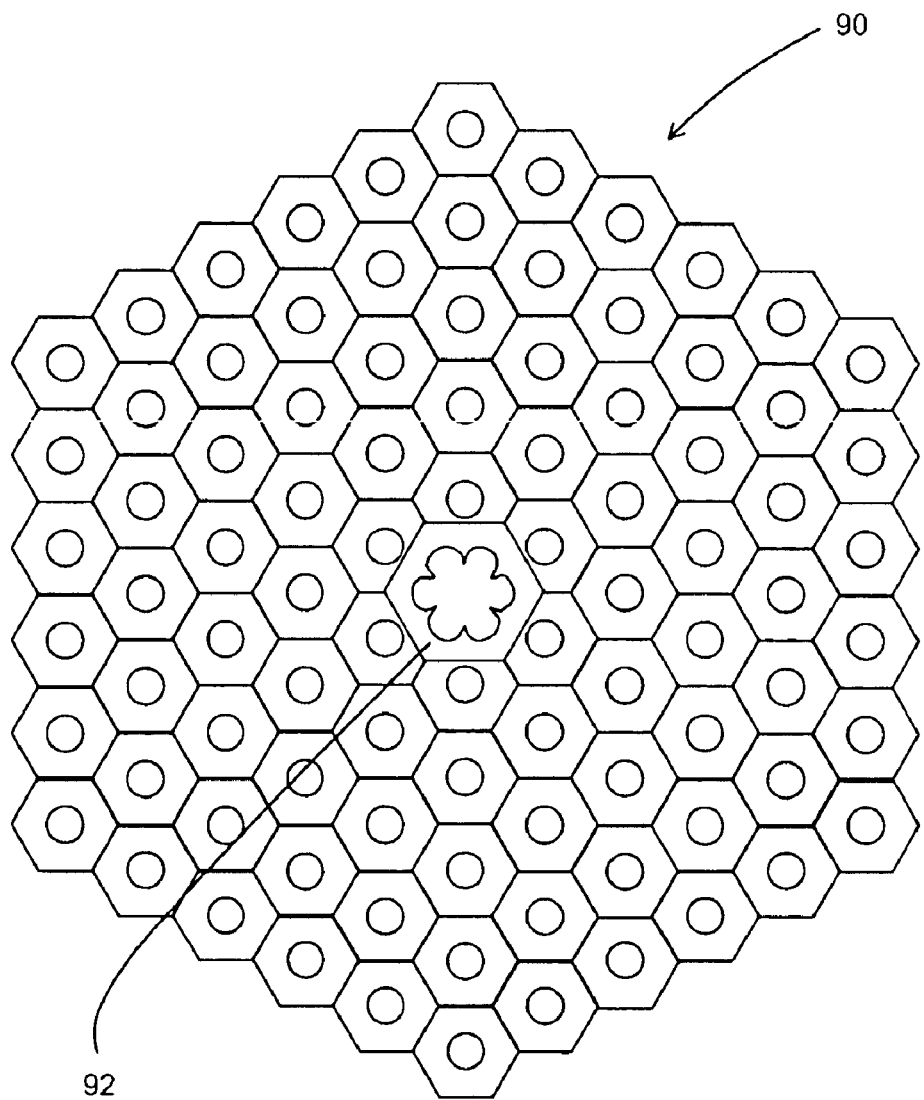
FIG. 7 is a cross-sectional view of an assembly having a core tube having a complex internal shape.

Another embodiment of the present invention is shown in cross-sectional view in FIG. 7. In this embodiment of the invention, assembly 90 is formed by stacking elongate elements as described in connection with FIG. 2. Core tube 92 is stacked in the core volume. The core tube may have a circular internal shape, or may have a substantially a circular internal shape. The core tube may have a complex internal shape, as shown in FIG. 7. Core tubes with desired internal shapes may be formed, for example, by depositing siliceous soot onto a shaped graphite rod, consolidating the soot and removing the graphite rod, as described in U.S. patent application Ser. No. 10/232,099, the specification of which is hereby incorporated herein by reference in its entirety. In this embodiment of the invention, the internal shape of core tube 92 serves to define the core of the eventual photonic band gap fiber. Assembly 90 may then be redrawn, etched, and drawn into a photonic band gap fiber as described above.

Figure 8:
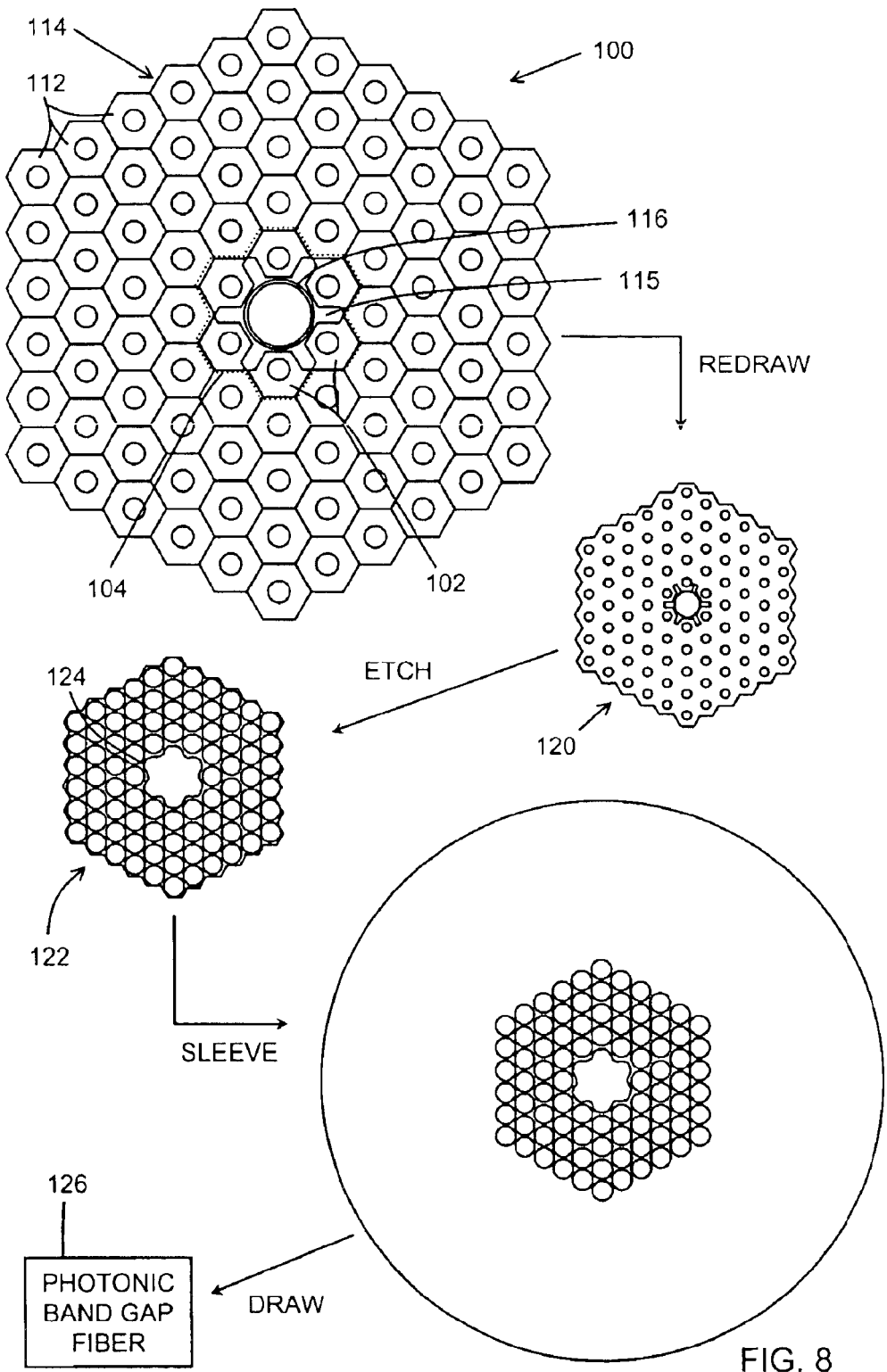
FIG. 8 is a cross-sectional view of a method of making a photonic band gap fiber according to another embodiment of the present invention.

Another embodiment of the present invention is shown in cross-sectional view in FIG. 8. Assembly 100 is formed by stacking elongate elements. The elongate elements 102 of first set 104 of elongate elements are truncated on three sides relative to elongate elements 112 of second set 114 of elongate elements. The core volume 116 defined by the first set 104 of elongate elements has a shape that is not an integral multiple of the external shapes of the elongate elements 112 of the second set 114 of elongate elements. A thin-walled core tube 116 is positioned in the core volume. The thin-walled core tube provides mechanical stability to the assembly, and will be substantially removed in a subsequent etching step. The assembly is redrawn, and the redrawn body 120 is etched as described above to form an etched body 122. In the etching step, the material corresponding to the truncated sides of the elongate elements 102 of the first set of elongate elements 104 is completely removed. The etched body may be sleeved and drawn into a photonic band gap fiber 126 as described above.

Figure 9:
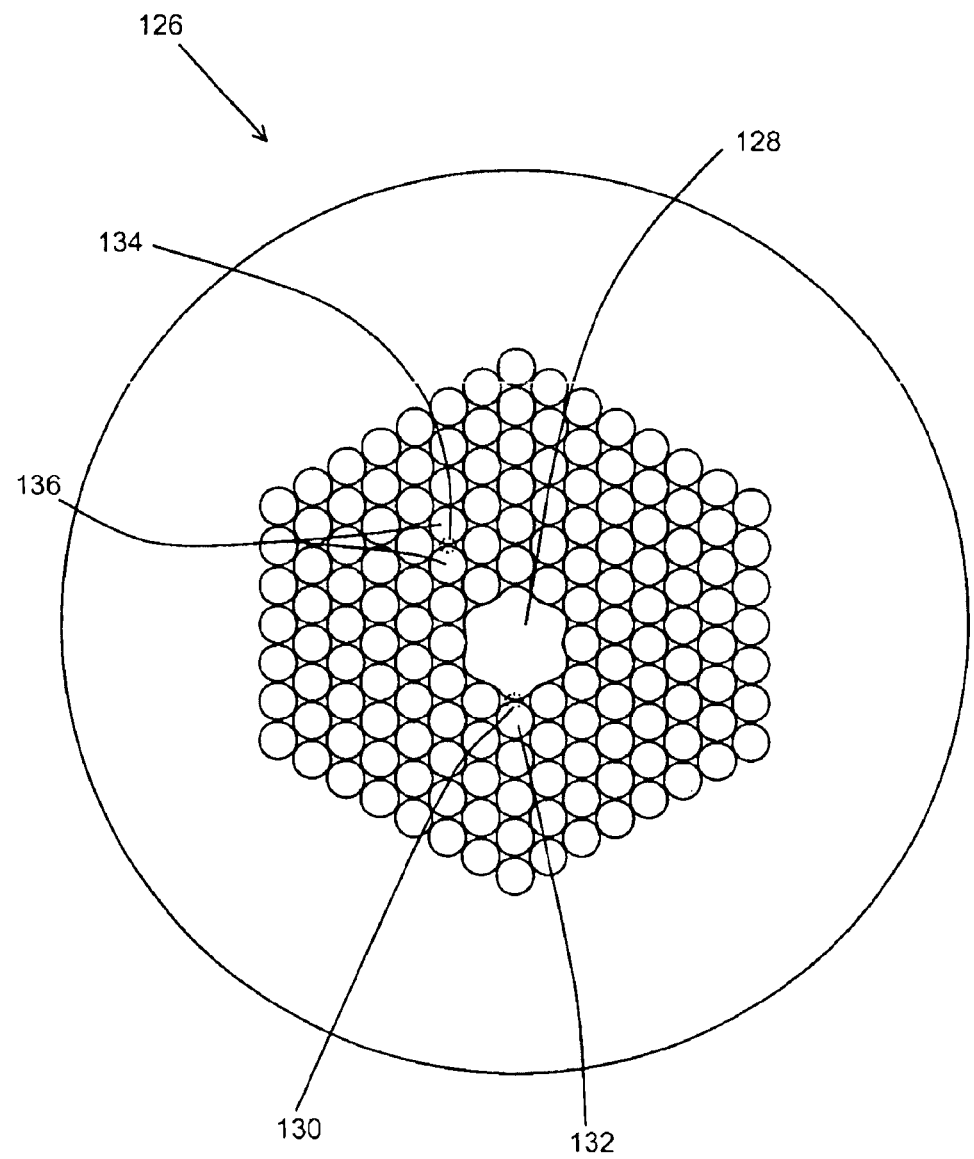
FIG. 9 is a cross-sectional view of an optical fiber fabricated using the method of FIG. 8.

The photonic band gap fiber made by the method of FIG. 8 is shown in FIG. 9. Photonic band gap fiber 126 has a core defect void 128. In suitable embodiments of the invention, the thickness of the wall of material 130 separating core defect void 128 from an adjacent hole 132 of the photonic band gap structure within about 50% of the thickness of the walls of material 134 separating adjacent holes 136 of the photonic band gap structure. In desirable embodiments of the invention, the thickness of the wall of material separating the core defect void from an adjacent hole is within about 25% of the thickness of the walls of material separating adjacent holes of the photonic band gap structure. In especially desirable embodiments of the present invention, the thickness of the wall of material separating the core defect void from an adjacent hole is about the same as thickness of the walls of material separating adjacent holes of the photonic band gap structure.

Figure 10:
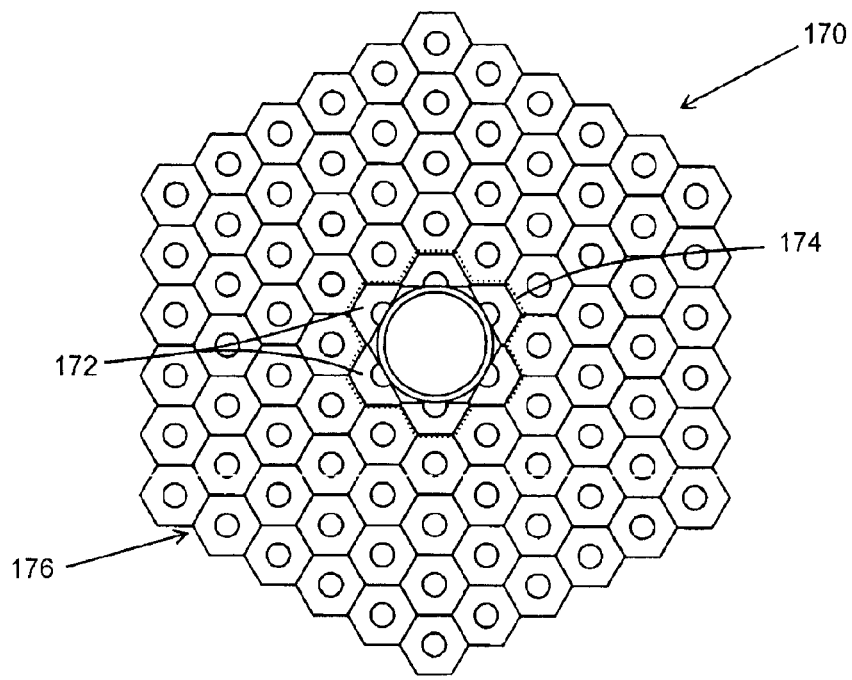
FIG. 10 is a cross sectional view of an assembly according to another embodiment of the present invention.

Another embodiment of the present invention is shown in cross-sectional view in FIG. 10. In the assembly 170 shown in FIG. 10, the elongate elements 172 of first set 174 of elongate elements do not have hole formed therein. Assembly 170 includes a think-walled core tube 177, which provides mechanical stability to the assembly, and can be removed in a subsequent etching step. Assembly 170 may be used to form a photonic band gap fiber with a core defect void diameter approaching three times the pitch of the photonic crystal structure.

Figure 11:
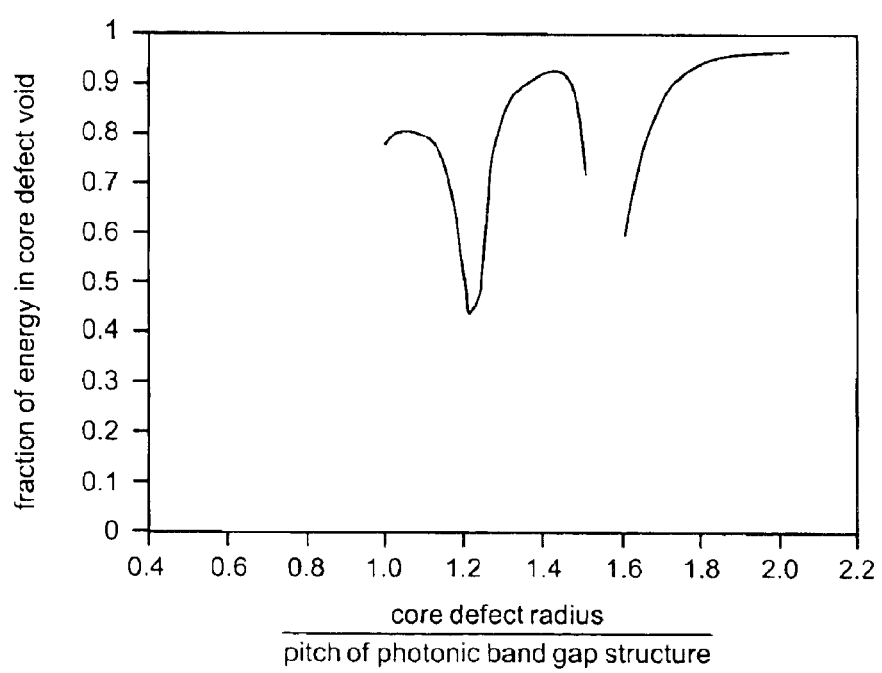
FIG. 11 is a graph of the amount of light in the core defect void versus the ratio of core defect void radius to photonic band gap structure pitch.

The present inventors have determined that desirable photonic band gap fibers of the present invention have a core defect void radius of between about 0.95 and about 1.15 times the pitch of the photonic band gap structure. Other desirable photonic band gap optical fibers of the present invention have a core defect void radius of between about 1.30 and about 1.55 times the pitch of the photonic band gap structure. As shown in FIG. 11 photonic band gap fibers having core defect radii of these sizes are predicted to propagate light with a high fraction of the energy in the core defect void, and therefore have a predicted low optical loss due to confinement of the optical mode. The methods of the present invention allow core defect voids of these desirable sizes to be achieved. In embodiments of the invention where the core volume of the assembly defines the eventual core defect void of the photonic band gap fiber (e.g. as described in connection with FIG. 2; it may be desirable for the core volume of the assembly to have a width of greater than 1.05 times the pitch of the periodic array formed by the holes of the second set of elongate elements. In embodiments of the invention where a core tube is located in the core volume of the assembly (e.g. as described in connection with FIG. 7), it may be desirable for the core volume of the assembly to have a width of greater than 1.15 times the pitch of the periodic array formed by the holes of the second set of elongate elements; and for the core tube to have an inner diameter of greater than 1.05 times the pitch of the periodic array formed by the holes of the second set of elongate elements.

Figure 12:
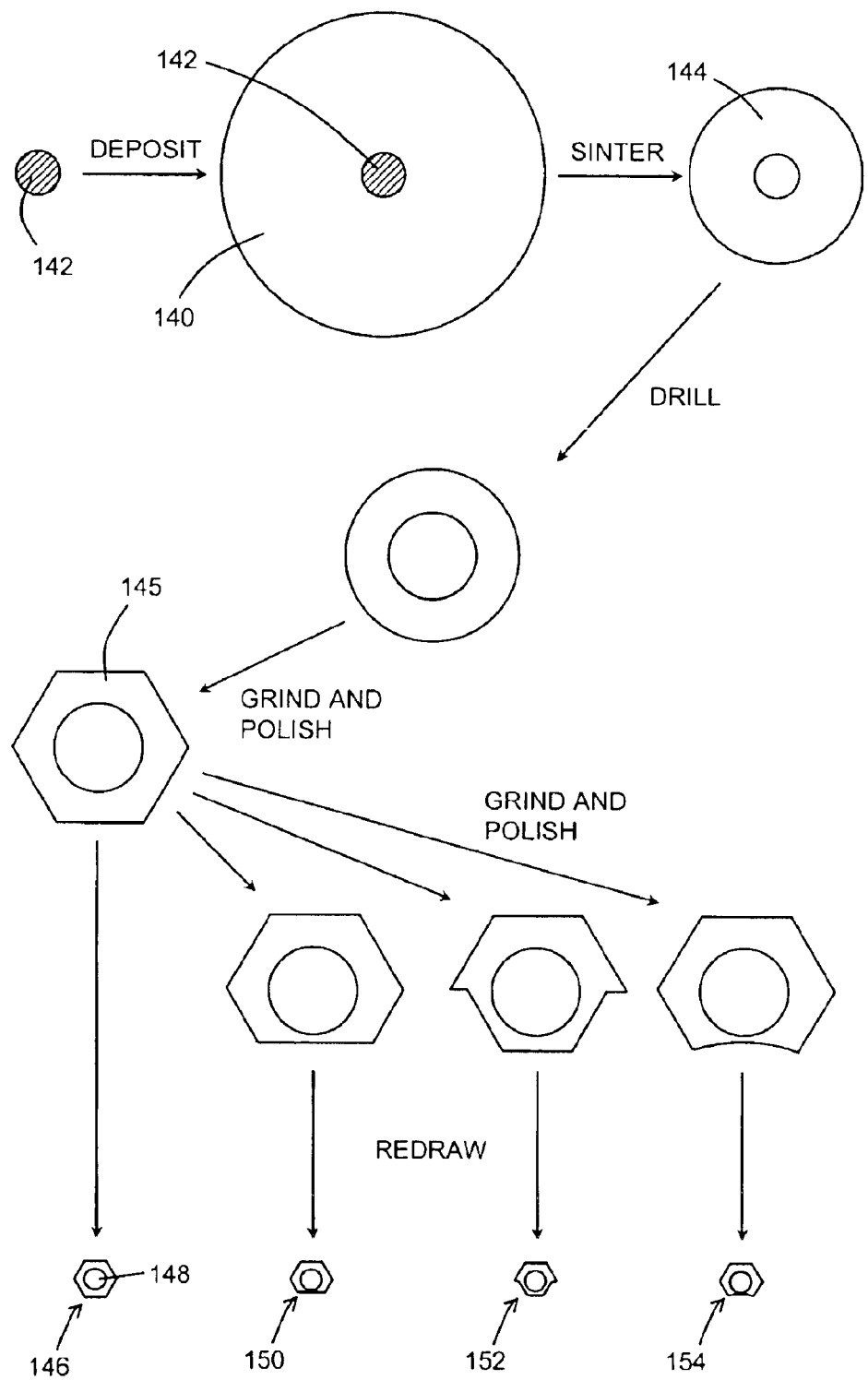
FIG. 12 is a cross-sectional view of a method to make the elongate elements used in the present invention.

The elongate elements of the present invention may be fabricated from a variety of materials, including, for example, doped or undoped silica glasses, lead silicate glasses, germanosilicate glasses, borosilicate glasses, chalcogenide glasses, phosphate glasses, and polymeric materials. The elongate elements used in the present invention may be fabricated using methods familiar to the skilled artisan. For example, as shown in cross-sectional view in FIG. 12, elongate elements made of doped or undoped silica may be fabricated by depositing silica soot 140 onto a bait rod 142 using CVD or FHD methods known in the optical fiber fabrication art, removing the bait rod, and sintering the soot to form a silica glass tube 144. The size of the bait rod may be selected to provide a hole of a desired size; alternatively, the hole may be drilled longitudinally to the desired size. The sides of the tube 144 are then ground and polished to yield a blank 145, which can be redrawn to yield, for example, a regular-hexagonal elongate element 146 having a hole 148. Blank 145 may be further ground on one or more sides to form, after redrawing, truncated hexagonal elements 150 and 152, such as those used in the embodiments of FIGS. 2 and 8. The blank 145 may be ground on a round tool to yield, after redrawing, an elongate element having a curved surface 154, such as those used in assembly 82 of FIG. 6. The blank 145 may also be ground so that the hole 148 becomes part of the outer surface of the element, forming, after redrawing, elongate element 156 such as those used in FIG. 9. The skilled artisan will appreciate that elongate elements having a wide variety of shapes and sizes may be used in the present invention, and that any suitable method of forming the elongate elements may be advantageously used.

It may be desirable to form the preform so that the material of an inner portion of the preform has a higher softening point than the material of an outer portion of the preform, as is described in commonly owned U.S. patent application Ser. No. 10/171,337, filed on Jun. 12, 2002 and entitled "MICROSTRUCTURED OPTICAL FIBERS AND METHODS AND PREFORMS FOR FABRICATING MICROSTRUCTURED OPTICAL FIBERS", the specification of which is hereby incorporated herein by reference in its entirety. For example, the difference in softening points may be about 50° C. or greater, about 100° C. or greater, or even about 150° C. or greater. One way to achieve such a difference is to use silica glass for the elongate elements, and a doped silica tube (e.g. germanium doped, fluorine doped, boron doped) as the sleeve tube. In cases where a specially-shaped core structure is used, it may be desirable to form the core structure from a material with an even higher softening point (e.g. tantalum-doped silica). Such a difference in softening point allows the inner portion of the preform to be at a somewhat higher viscosity during the draw, leading to less distortion of the inner portion of the structure.

In order to reduce the occurrence of breaks during the draw and lower the level of attenuation in the drawn fiber, it may be desirable to provide a preform having reduced levels of contaminants (e.g. particulate contaminants, organic contaminants, inorganic contaminants) as well as reduced levels of OH content (i.e. surface-adsorbed water). As such, it may be desirable to clean the preform at various stages of manufacture with a chlorine-containing gas (e.g. a mixture of chlorine and helium). As the skilled artisan will recognize, chlorine gas is effective at removing many types of contaminants. For example, chlorine gas may react with water (e.g. in the form of surface OH) and many inorganic contaminants to form volatile species that are removed in a subsequent purge cycle. Chlorine may also act to oxidize various organic species. It may also be desirable to include exposure to oxygen in a cleaning regimen in order to more fully remove organic contaminants. The cleaning processes described herein are not limited to the photonic band gap fibers described herein; these processes may be advantageously used with any microstructured optical fiber made using a stack-and-draw method (e.g. photonic crystal fibers, photonic band gap fibers, holey fibers). The methods described herein may be used at any stage in microstructured optical fiber manufacture; for example, they may be performed on an article used in the fabrication of microstructured optical fiber selected from the group consisting of a stacked assembly, a redrawn body, an etched body, and a structured optical fiber preform.

For example, it may be desirable to clean the stacked assembly of elongate elements before the redraw step. Cleaning of the stacked assembly of elongate elements before the redraw step removes any contamination on the external surfaces of the elongate elements, thereby preventing an surface contaminants of the elongate elements from being buried in the glass structure of the redrawn body. It may also be desirable to clean the preform immediately before it is drawn. For example, in order to ensure the holes of the preform remain open in the drawn fiber, one end of the preform is capped by flameworking a piece of glass to one end of the preform. This operation may deposit water and other contaminants on the surfaces of the holes of the preform; removal of these contaminants may be effected by a chlorine cleaning process.

Simple flowing of a chlorine-containing gas through a furnace may not force the chlorine into the long, narrow holes of the stacked assembly or of the preform. In order to ensure that the capped holes of the stacked assembly or of the preform are fully contacted by the cleaning gas, it may be desirable to substantially evacuate the furnace in which the cleaning is performed before introduction of the chlorine-containing gas. For example, the pressure inside the furnace may be brought to below about 50 Torr. The chlorine-containing gas will then fill the evacuated holes of the assembly or preform. Multiple evacuate/clean cycles may be used in a cleaning process.

When using a large furnace continuously maintained at a high temperature, it is necessary to remove the hot cleaned assembly or preform from the furnace in order to allow it to cool. Exposure of the hot preform to the atmosphere to cool can cause contamination due to water and organic adsorption. As such, it is desirable to allow the stacked assembly preform to cool from the cleaning process temperature in an inert atmosphere (e.g. helium gas). It may be desirable to perform the cleaning process in a relatively small tube furnace, so that the preform may be allowed to cool under helium purge in the furnace itself.

It is desirable to perform the chlorine cleaning process in a furnace at high temperatures (e.g. above 800° C.). Gaseous mixtures of 10% chlorine in helium and 10% oxygen in helium may be used as the cleaning gases; substantially pure helium may be used as a purge gas. The cleaning may be performed by raising the furnace temperature to 1000° C.; substantially evacuating the furnace (e.g. to about 20 Torr or less); filling the furnace with 10% chlorine and allowing the preform to soak (e.g. for 20 minutes); and purging with helium (e.g. for 5 minutes). A plurality of evacuate/clean/purge cycles may be used. In order to minimize post-cleaning contamination of the preform, it is desirable to allow the cleaned preform to cool to room temperature in a flow of helium in the furnace. An example of a suitable cleaning process is described in the Example below. However, the skilled artisan will recognize that substantial modifications may be made to the chlorine cleaning process described here; for example, process temperatures and times may be adjusted, and different purge gases (e.g. argon) may be used.

The structured optical fiber preforms of the present invention may be made using other methods familiar to the skilled artisan. For example, redraw techniques may be used to reduce the preform diameter. Etching with $SF_6$, $NF_3$ or aqueous $NH_4F.HF$ may be used to enlarge the size of the holes. Redraw and etching procedures are described, for example, in U.S. patent application Ser. No. 09/563,390, the specification of which is hereby incorporated herein by reference in its entirety.

The structured optical fiber preforms may be drawn into microstructured optical fiber using methods familiar to the skilled artisan. Additionally, a pressure may be placed on the holes of the preform during the draw in order to keep them from closing due to surface tension. Alternatively, on the side of the preform opposite the drawn side, the ends of the holes may be closed in order to maintain a positive pressure inside the holes of the preform, thereby preventing them from closing due to surface tension. It may be desirable to place different pressures on different sets of holes of the preform, as is described in commonly owned U.S. patent application Ser. No. 10/171,335, filed Jun. 12, 2002 and entitled "METHODS AND PREFORMS FOR DRAWING MICROSTRUCTURED OPTICAL FIBERS", the specification of which is hereby incorporated herein by reference in its entirety. For example, the large core hole of a photonic band gap fiber may be coupled to a first pressure system, and the holes of the photonic crystal structure may be coupled to a second pressure system. The first pressure system may be set to a lower pressure than the second pressure system so that the inner core hole does not expand relative to the holes of the photonic crystal structure.

EXAMPLE

A photonic band gap fiber was fabricated using the methods of the present invention.

Figure 13:
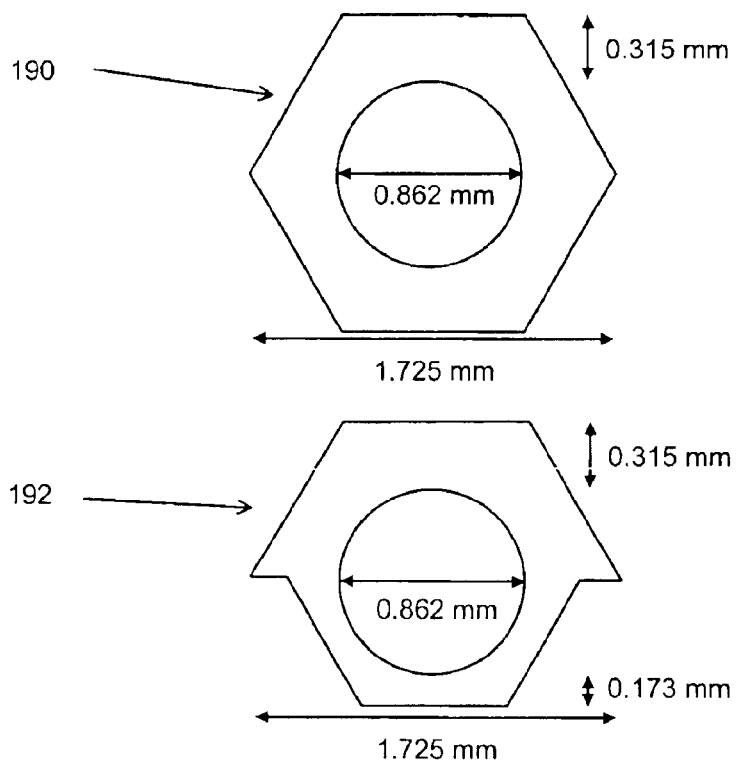
FIG. 13 is a cross-sectional view of the elongate elements used in the Example.

Silica tubing (Heraues F300) having an outer diameter of about 50 mm and an inner diameter of 25 mm was machined to yield blanks having a 47 mm apex-to-apex regular hexagonal cross-section with a 25 mm diameter circular hole centered in the regular hexagon. One regular hexagonal blank was then redrawn and cut to canes 0.5 m in length to form regular hexagonal elongate elements having a 1.725 mm apex-to-apex distance (FIG. 13, 190). A second regular hexagonal blank was further machined on three sides to yield a truncated hexagonal blank, which was redrawn and cut to canes 0.5 m in length to yield truncated hexagonal elongate elements 192. The elongate elements 190 and 192 were capped on one end by sealing the hole shut in a flame.

Figure 14:
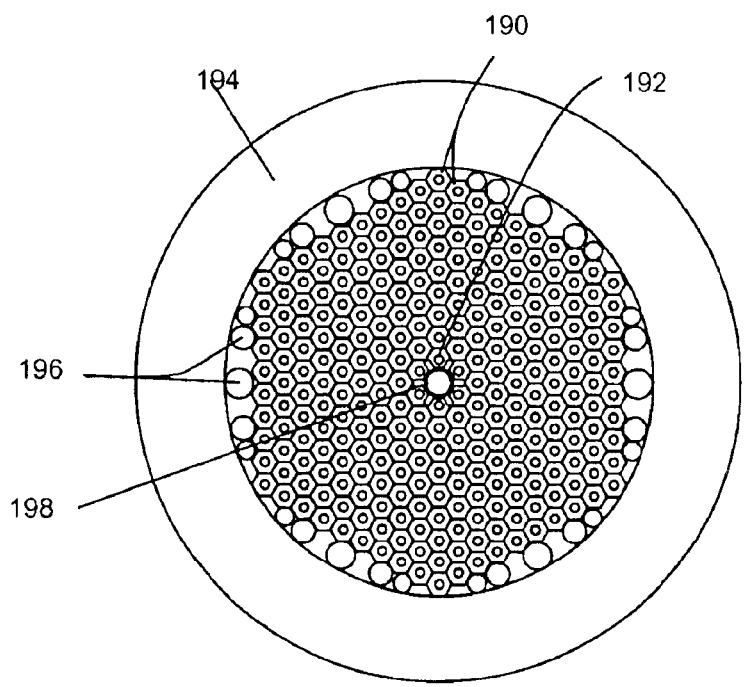
FIG. 14 is a cross-sectional view of the stacked assembly of the Example.

As shown in FIG. 14, the regular hexagonal elongate elements 190 were stacked in a hexagonal close-packed lattice, and arranged in a 40 mm inner diameter ×50 mm outer diameter ×0.5 m long silica tube 194. Filler rods 196 were used to fix the lattice in place in the tube. The centermost seven regular hexagonal elongate elements were removed from the lattice, and replaced with six truncated hexagonal elongate elements 192 and a thin-walled 1.5 mm outer diameter x ~1.3 mm inner diameter circular tube 198. In stacking the assembly, the capped ends of the elongate elements were positioned on the same end of the assembly. A hollow glass handle was attached to the capped end of the assembly, and a flat piece of glass was attached to the uncapped end of the assembly.

The outside of the assembly was cleaned with a laboratory wipe soaked with acetone, and placed in a Barnstead Thermolyne #53900 tube furnace. The furnace tube was purged with 400 sccm helium as the temperature was raised to 1000° C. The furnace tube was evacuated to about 20 Torr, then filled to about 760 Torr with 10% chlorine in helium. The assembly was allowed to soak in the chlorine/helium mixture for 20 minutes, after which time the furnace tube was purged with 400 sccm helium for 5 minutes. This evacuate/chlorine clean/purge cycle was performed a total of three times. The furnace tube was then evacuated to about 20 Torr, then 10% oxygen in helium was allowed to flow at 400 sccm through the tube for 20 minutes. The tube was purged with helium overnight while the furnace tube was allowed to cool to room temperature.

Figure 15:
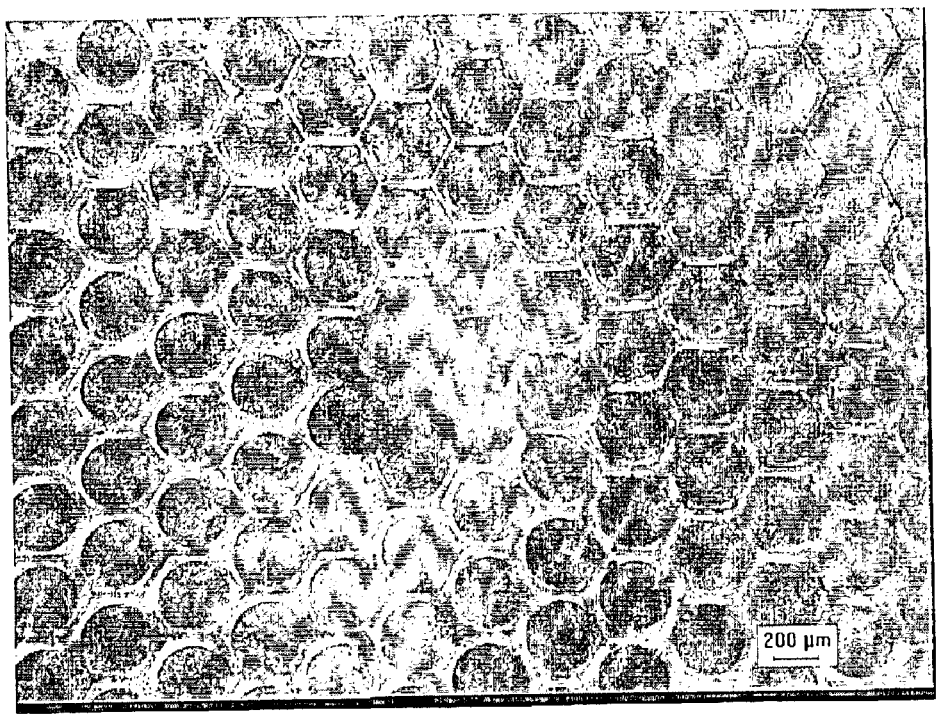
FIG. 15 is an end-on view of the etched preform of the Example.
Figure 16:
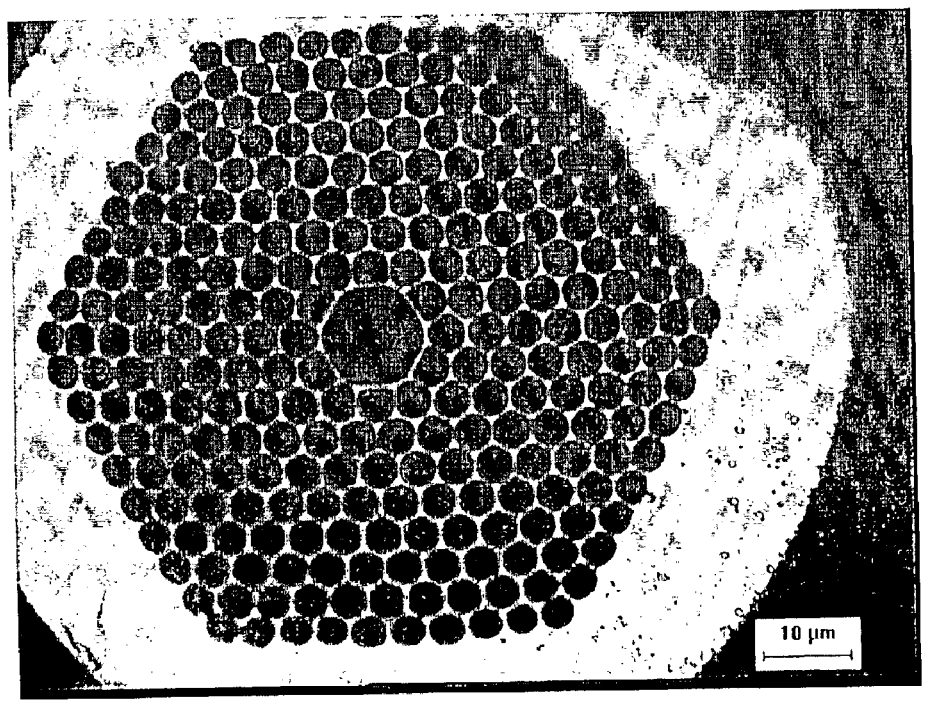
FIG. 16 is an end-on view of the drawn photonic band gap fiber of the Example.

The assembly was redrawn in a furnace at a temperature of 2078° C. under a torque of 11 lb/in to yield a body having a cross-sectional diameter of 12 mm. A slight vacuum was pulled on the interstitial voids through the hollow handle to collapse them during the redraw. The redrawn assembly was etched with 28 wt % $NH_4F.HF$ at 58° C. for 90 minutes to yield the etched preform shown FIG. 15. The etched preform was drawn into fiber at a furnace temperature of 1950 –1980° C. to yield the photonic band gap fiber shown in FIG. 16.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of fabricating a photonic band gap fiber having a photonic band gap structure, the photonic band gap structure having a pitch and a core defect void formed therein, the method comprising the steps of:

(a) forming an assembly of stacked elongate elements, the assembly including
a first set of elongate elements, the first set of elongate elements defining and surrounding a core volume, the core volume being contiguous to an outer edge of each elongate element of the first set of elongate elements, and a second set of elongate elements surrounding the first set of elongate elements, each elongate element of the second set of elongate elements having an external polygonal shape, each of the second set of elongate elements having a hole formed longitudinally therein, wherein the core volume defined by the first set of elongate elements has a shape that is essentially not an integer multiple of the external shape of the elongate elements of the second set of elongate elements;

(b) including the assembly in a photonic band gap fiber preform; and (c) drawing the photonic band gap fiber preform into the photonic band gap fiber.

2. The method of claim 1, wherein at least one of the elongate elements of the first set of elements has a substantially different external shape than the elongate elements of the second set of elongate elements.

3. The method of claim 2, wherein each of the elongate elements of the first set of elements has a substantially different external shape than the elongate elements of the second set of elongate elements.

4. The method of claim 1 wherein the assembly includes a core tube disposed in the core volume.

5. The method of claim 4 wherein the core tube has a substantially acircular internal shape.

6. The method of claim 1 wherein the holes of the second set of elongate elements form a periodic array having a pitch, the periodic array being interrupted by the core volume.

7. The method of claim 6 wherein the assembly includes a core tube disposed in the core volume, the core tube having an inner diameter of greater than about 1.05 times the pitch of the periodic array.

8. The method of claim 7 wherein the core volume has a width of greater than about 1.05 times the pitch of the periodic array.

9. The method of claim 1 wherein each of the first set of elongate elements has a hole formed longitudinally therein, and wherein the holes of the first set of elongate elements and of the second set of elongate elements form a periodic array having a pitch.

10. The method of claim 1 wherein the core volume has a substantially different symmetry around an axis parallel to the longitudinal direction of the assembly than does the periodic array formed by the holes of the second set of elongate elements.

11. The method of claim 1 wherein the unit cell of the periodic structure formed by the second set of elongate elements has a cross-sectional shape selected from the group consisting of hexagonal, triangular, square and rectangular.

12. The method of claim 1 wherein the core volume has an external shape selected from the group consisting of circular, elliptical, hexagonal, square, and rectangular.

13. The method of claim 1 wherein at least one elongate element of the first set of elongate elements has an external shape that is a truncated version of the external polygonal shape of the elongate elements of the second set of elongate elements.

14. The method of claim 1 wherein at least one elongate element of the first set of elongate elements is formed by removing material from an elongate element substantially identical to the elongate elements of the second set of elongate elements.

15. The method of claim 1 wherein the core defect hole of the photonic band gap fiber has a radius between about 0.95 and about 1.15 times the pitch of the photonic band gap structure.

16. The method of claim 1 wherein the core defect hole of the photonic band gap fiber has a radius between about 1.30 and about 1.55 times the pitch of the photonic band gap structure.

* * * * *